United States Patent
Rosa et al.

(10) Patent No.: US 9,520,041 B2
(45) Date of Patent: Dec. 13, 2016

(54) MONITORING INTRUSION IN AN AREA USING WIFI-ENABLED DEVICES

(71) Applicant: Ekin Labs OY, Tampere (FI)

(72) Inventors: Francescantonio Della Rosa, Tempere (FI); Jari Nurmi, Tampere (FI)

(73) Assignee: RADIOMAZE INC., Cupertino, CA (US)

( * ) Notice: Subject to any disclaimer, the term of this patent is extended or adjusted under 35 U.S.C. 154(b) by 36 days.

(21) Appl. No.: 14/439,613

(22) PCT Filed: Nov. 5, 2012

(86) PCT No.: PCT/EP2012/071800
§ 371 (c)(1),
(2) Date: Apr. 29, 2015

(87) PCT Pub. No.: WO2014/067586
PCT Pub. Date: May 8, 2014

(65) Prior Publication Data
US 2015/0302712 A1    Oct. 22, 2015

(51) Int. Cl.
*G08B 13/18* (2006.01)
*G08B 13/24* (2006.01)
(Continued)

(52) U.S. Cl.
CPC ............ *G08B 13/2491* (2013.01); *G01S 5/02* (2013.01); *G01S 7/292* (2013.01); *G01S 11/06* (2013.01);
(Continued)

(58) Field of Classification Search
CPC . G08B 13/2491; G08B 25/007; G08B 13/187; G01S 7/292; H04B 1/7163
(Continued)

(56) References Cited

U.S. PATENT DOCUMENTS 3,877,002 A * 4/1975 Cheal ............... G08B 13/2491
340/552
5,578,988 A * 11/1996 Hoseit ............... G08B 13/2494
340/541
(Continued)

FOREIGN PATENT DOCUMENTS

WO    WO-2014/067586 A1    5/2014

OTHER PUBLICATIONS

International Search Report and Written Opinion issued by the European Patent Office as International Searching Authority for International Application No. PCT/EP2012/071800 dated Feb. 13, 2013 (9 pages).

(Continued)

*Primary Examiner* — John A Tweel, Jr.
(74) *Attorney, Agent, or Firm* — Wilmer Cutler Pickering Hale and Dorr LLP

(57) ABSTRACT

For monitoring an area, signal strength samples are obtained (S1) by sampling a data signal transmitted from at least one first device and received by at least one second device, and measuring a signal strength of the sampled data signal. The signal strength samples are processed (S2) by forming consecutive first groups of N consecutive signal strength samples, calculating first standard deviations for each of the consecutive first groups, forming consecutive second groups of N consecutive first standard deviations, and calculating second standard deviations for each of the consecutive second groups. Based on the second standard deviations, it is detected (S3) if a fluctuation in the data signal received by the second device has occurred that represents an intrusion in the area.

17 Claims, 3 Drawing Sheets

(51) Int. Cl.
*G08B 13/187* (2006.01)
*G01S 7/292* (2006.01)
*G01S 5/02* (2010.01)
*G01S 11/06* (2006.01)
*H04W 76/02* (2009.01)

(52) U.S. Cl.
CPC .......... *G08B 13/187* (2013.01); *H04W 76/023* (2013.01)

(58) Field of Classification Search
USPC .............. 340/552, 541; 342/28; 455/69, 522
See application file for complete search history.

(56) References Cited

U.S. PATENT DOCUMENTS

| | | | | |
|---|---|---|---|---|
| 6,614,384 | B2* | 9/2003 | Hall | G08B 13/187 342/28 |
| 7,295,109 | B2* | 11/2007 | Kobayashi | G08B 25/007 340/541 |
| 2005/0055568 | A1* | 3/2005 | Agrawala | H04L 43/00 726/2 |
| 2006/0017566 | A1* | 1/2006 | Gauvreau | G08B 13/2491 340/541 |
| 2006/0217132 | A1* | 9/2006 | Drummond-Murray | H04W 64/00 455/456.2 |
| 2008/0018464 | A1 | 1/2008 | van Doorn et al. | |
| 2012/0146788 | A1 | 6/2012 | Wilson et al. | |

OTHER PUBLICATIONS

Kaltiokallio, O. and Bocca, M., "Real-Time Intrusion Detection and Tracking in Indoor Environment Through Distributed RSSI Processing," 2011 IEEE 17th International Conference on Embedded and Real-Time Computing Systems and Applications, pp. 61-70 (Aug. 28, 2011).

Mrazovac, B., et al., "A Human Detection Method for Residential Smart Energy Systems Based on Zigbee RSSI Changes," IEEE Transactions on Consumer Electronics, IEEE Service Center, New York, NY, vol. 58, No. 3, pp. 819-824 (Aug. 1, 2012).

Patwari, N. and Wilson, J., "RF Sensor Networks for Device-Free Localization: Measurements, Models, and Algorithms," Proceedings of the IEEE, New York, vol. 96, No. 11, pp. 1961-1973 (Nov. 1, 2010).

Youssef, M., et al., "Challenges: Device-free Passive Localization for Wireless Environments," Proceedings of the 13th Annual ACM International Conference on Mobile Computing and Networking, Montreal, Quebec, Canada, pp. 222-229 (Sep. 9, 2007).

* cited by examiner

MONITORING INTRUSION IN AN AREA USING WIFI-ENABLED DEVICES

CROSS-REFERENCE TO RELATED APPLICATION

This application is a national stage of PCT International Application No. PCT/EP2012/071800 (published as WO 2014/067586 A1), filed on Nov. 5, 2012, the contents of which are hereby incorporated by reference.

BACKGROUND OF THE INVENTION

Field of the Invention

The present invention relates to monitoring intrusion in an area using WIFI-enabled devices. For example, human presence in indoor environments is detected and processed using WiFi-enabled devices.

Related Background Art

The following meanings for the abbreviations used in this specification apply:
AP access point
GNSS global navigation satellite system
PC personal computer
PDA personal digital assistant
RSS received signal strength
SMS short message service
SOS standard deviation of standard deviation
UE user equipment
WiFi wireless fidelity Monitoring systems for indoor environments typically require a wired or wireless dedicated infrastructure. The user has to buy and install additional equipment for carrying out monitoring tasks. Currently, the monitoring industry is highly fragmented in a variety of look-alike solutions providing traditional approaches, exploiting a plethora of diverse sensors and systems. A traditional monitoring system consists in a series of sensors, a control panel, wiring, and an alarm notification system. Intruders can be detected in various ways with dedicated sensors monitoring household areas, such as rooms, doors and windows contacts. Many different sensors exploiting different technologies can be used, such as: ultrasonic detectors, passive infrared detectors, photo-electric beams, microwave detectors, video motion detectors.

SUMMARY OF THE INVENTION

The present invention aims at providing a cost-saving and non-complex monitoring system.

This is achieved at least in part by the method and apparatus as defined in the appended claims. The invention may also be implemented by a computer program product.

If traditional monitoring systems have always consisted in a series of sensors, control panels, wiring, etc., with the present invention this paradigm is turned upside down. Until now the only tangible value of commercial monitoring systems, aside from price comparisons and complexity, was the ability to reliably detect intrusions. When paired with devices already available to users at home the system proposed by the present invention will not require the purchase and physical installation of a dedicated monitoring system anymore.

According to an embodiment of the invention, a received signal strength (RSS) of WiFi-enabled devices is used, which are devices commonly present in an indoor environment to be monitored for detection and notification of presence of human beings within the indoor physical environment in the range of the devices.

In the following the invention will be described by way of embodiments thereof with reference to the accompanying drawings.

BRIEF DESCRIPTION OF THE DRAWINGS

FIG. 4 illustrates a simplified block diagram of an electronic device suitable for use in practicing the exemplary embodiments of this invention.

DESCRIPTION OF THE EMBODIMENTS

The presence of an object such as a human body in an area such as an indoor environment causes a change in a strength of a received signal (RSS) proportional to both mass of the object and distance of the object to a transmitter of the signal or to a receiver of the signal.

In opposition to a widespread and optimistic belief in previous literature it is assumed here that through a simplistic analysis of the RSS, a reliable detection of the presence of an object, e.g. a human body, in a given environment is not possible. In fact the RSS is corrupted by several intrinsic sources of noise and its dynamics are affected by several factors: distance between the transmitter and the receiver, distance between the human body and the transmitter, distance between the human body and the receiver, mass of the human body, topology of the indoor environment (e.g. number of rooms, size of the rooms, number of floors, etc.), furniture in the indoor environment, materials of the indoor environment (walls structure in concrete, bricks, stones, metal, wood, etc.), and WiFi-enabled device type.

A primary source of noise for the RSS are anomalies that are related to the absence of real human-induced perturbations, e.g. fluctuations of the RSS in a stable environment.

A secondary source of noise lies in the fact that the RSS can also be affected by the presence of signal outliers, that normally arise in the receiver as an intrinsic inability to correctly receive all the beacons from the transmitter. The aforementioned outliers do not have a physical causation counterpart related to the environment, but are solely related to inherent hardware/software limitations.

According to the present invention it is possible to have a system and method to process the RSS in such a way to reliably identify the human-induced anomalies in the indoor environment.

Figure 1:
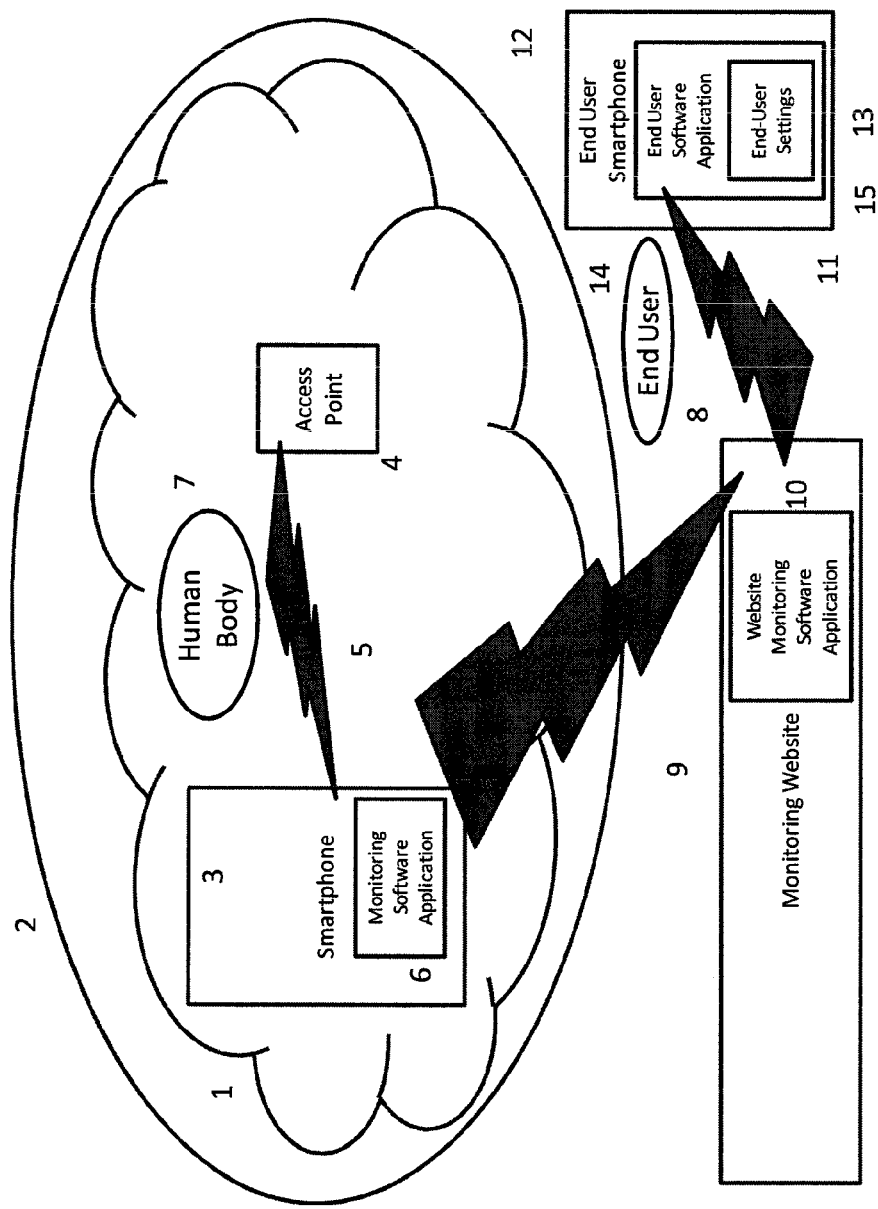
FIG. 1 shows a schematic diagram illustrating a monitoring system for detecting presence of a human being in an indoor environment within a range of devices and notifying an end user according to an embodiment of the invention.

Turning now to the figures, FIG. 1 illustrates an indoor environment 1 to be monitored through a WiFi network 2 consisting of at least two WiFi-enabled devices, which may comprise an access point (AP), wireless router, broadband gateway (integrated home access device), portable MP3 player, stationary (speakers, receiver, MP3 player), e-reader, game console, portable gaming device, media adapter, media remote/input device, media server, navigation/GNSS, picture frame, set top box, media extender (includes players & recorders), still camera, television, video camera, web camera, docking station, keyboard, laptop computer, monitor, mouse, network storage device (networked hard drive), PDA (personal digital assistant), printer/multi-function printer/print server, projector, tablet PC, ultra-mobile PC, handsets, phone, smart-phone, in-vehicle network, medical/fitness device, smart energy appliances, hot water heater, refrigerator, thermostat, transmission and distribution equipment, utility meter, washer/dryer, embedded sensor.

In an exemplary embodiment of the invention, the WiFi-enabled devices comprise a smart-phone device 3 and an AP device 4. The devices 3 and 4 create a wireless link 5, which is processed by a monitoring software application unit 6 running on the smart-phone device 3. If the monitoring software application unit 6 detects an alarm caused by the presence of a human body 7, a proper notification is sent to a monitoring website unit 8 through a telecommunication link 9. A website monitoring software application unit 10 running on the monitoring website unit 8 sends further notifications through a telecommunication link 11 to an end-user smart-phone device 12, where finally an end-user software application unit 13 running on the end-user smart-phone device 12 notifies an end user 14 according to user settings 15 for the end user software application unit 13.

Figure 2:
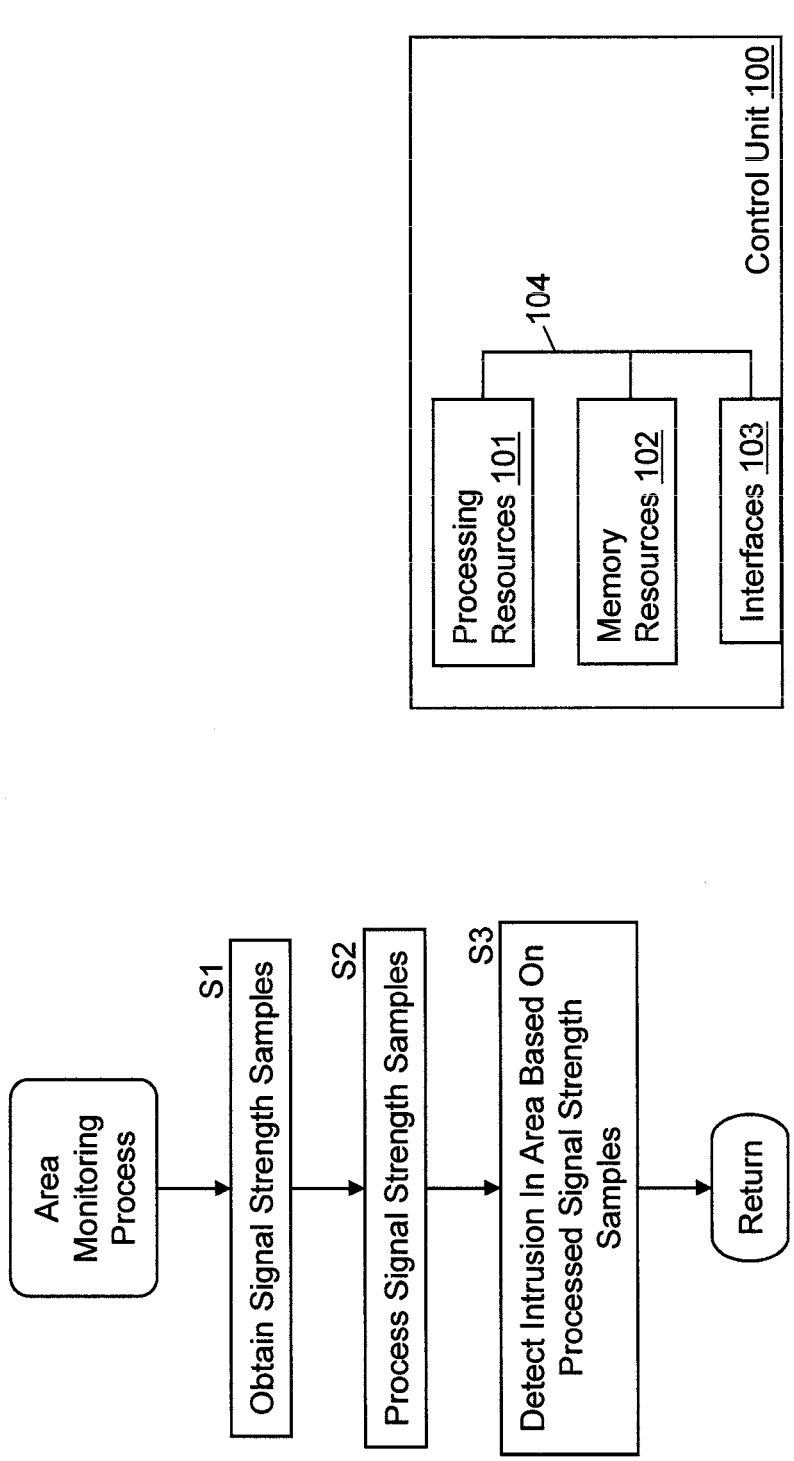
FIG. 2 shows a flowchart illustrating an area monitoring process according to an embodiment of the invention.

An area monitoring process according to an embodiment of the invention, which at least in part may be executed by the monitoring software application unit 6 is depicted in FIG. 2.

In step S1, signal strength samples $x_1, x_2, \ldots, x_{N-1}, x_N, x_{N+1}, \ldots$ are obtained. That is, a data signal transmitted from at least one first device (e.g. device 4) and received by at least one second device (e.g. device 3) through at least one wireless link (e.g. wireless link 5) within the area between the at least one first device and the at least one second device is sampled, and a signal strength of the sampled data signal is measured.

In step S2, the signal strength samples obtained from step S1 are processed. That is, consecutive first groups $w^x$ of N consecutive signal strength samples are formed such that two directly consecutive first groups are different by one signal strength sample, as shown in the following equations:

$$w_1^x = [x_1, x_2, \ldots, x_N] \tag{1a}$$

$$w_2^x = [x_2, x_3, \ldots, x_{N+1}] \tag{1b}$$

$$w_N^x = [x_N, x_{N+1}, \ldots, x_{2N-1}] \tag{1c}$$

Next, first standard deviations $\sigma^2(w^x)$ for each of the consecutive first groups are calculated, as shown in the following equations:

$$\sigma_1^2(w_1^x) = \frac{1}{N}\sum_{i=1}^{N}(x_i - \overline{x})^2 \tag{2a}$$

$$\sigma_2^2(w_2^x) = \frac{1}{N}\sum_{i=2}^{N+1}(x_i - \overline{x})^2 \tag{2b}$$

$$\sigma_N^2(w_N^x) = \frac{1}{N}\sum_{i=N}^{2N-1}(x_i - \overline{x})^2 \tag{2c}$$

Next, consecutive second groups $w^{\sigma 2}$ of N consecutive first standard deviations are formed such that two directly consecutive second groups are different by one first standard deviation, as shown in the following equations:

$$w_1^{\sigma 2} = [\sigma_1^2(w_1^x), \sigma_2^2(w_2^x), \ldots, \sigma_N^2(w_N^x)] \tag{3a}$$

$$w_2^{\sigma 2} = [\sigma_2^2(w_2^x), \sigma_3^2(w_3^x), \ldots, \sigma_{N+1}^2(w_{N+1}^x)] \tag{3b}$$

$$w_N^{\sigma 2} = [\sigma_N^2(w_N^x), \sigma_{N+1}^2(w_{N+1}^x), \ldots, \sigma_{N+1}^2(w_{2N-1}^x)] \tag{3c}$$

And second standard deviations SoS for each of the consecutive second groups are calculated as shown in the following equations:

$$SoS_1 = \sigma_1^2(w_1^{\sigma 2}) = \frac{1}{N}\sum_{i=1}^{N}\left(\sigma_i^2(w_i^{\sigma 2}) - \overline{\sigma_1^2(w_1^{\sigma 2})}\right)^2 \tag{4a}$$

$$SoS_2 = \sigma_2^2(w_2^{\sigma 2}) = \frac{1}{N}\sum_{i=2}^{N+1}\left(\sigma_i^2(w_i^{\sigma 2}) - \overline{\sigma_2^2(w_2^{\sigma 2})}\right)^2 \tag{4b}$$

$$SoS_N = \sigma_N^2(w_N^{\sigma 2}) = \frac{1}{N}\sum_{i=N}^{2N-1}\left(\sigma_i^2(w_i^{\sigma 2}) - \overline{\sigma_N^2(w_N^{\sigma 2})}\right)^2 \tag{4c}$$

In step S3, based on the second standard deviations it is detected if a fluctuation in the data signal received by the second device has occurred that represents an intrusion in the area.

The at least one wireless link within the area between the at least one first device and the at least one second device may be initiated by the monitoring software application 6 and created by the smart-phone device 3.

In step S3, consecutive third groups $w^{SoS}$ of N consecutive second standard deviations may be formed such that two directly consecutive third groups are different by one second standard deviation, as shown in the following equations:

$$w_1^{SoS} = [SoS_1, SoS_2, \ldots, SoS_N] \tag{5a}$$

$$w_2^{SoS} = [SoS_2, SoS_3, \ldots, SoS_{N+1}] \tag{5b}$$

$$w_N^{SoS} = [SoS_N, SoS_{N+1}, \ldots, SoS_{2N-1}] \tag{5c}$$

Third standard deviations $\sigma^2(w^{SoS})$ for each of the consecutive third groups may be calculated as shown in the following equations:

$$\sigma_1^2(w_1^{SoS}) = \frac{1}{N}\sum_{i=1}^{N}\left(\sigma_i^2(w_i^{SoS}) - \overline{\sigma_1^2(w_1^{SoS})}\right)^2 \tag{6a}$$

$$\sigma_2^2(w_2^{SoS}) = \frac{1}{N}\sum_{i=2}^{N+1}\left(\sigma_i^2(w_i^{SoS}) - \overline{\sigma_2^2(w_2^{SoS})}\right)^2 \tag{6b}$$

$$\sigma_N^2(w_N^{SoS}) = \frac{1}{N}\sum_{i=N}^{2N-1}\left(\sigma_i^2(w_i^{SoS}) - \overline{\sigma_N^2(w_N^{SoS})}\right)^2 \tag{6c}$$

For each third standard deviation, a threshold T may be calculated based on the third standard deviation and N consecutive second standard deviations corresponding to the third standard deviation, as shown in the following equations:

$$T_1 = \frac{1}{N}\sum_{i=1}^{N}\sigma_i^2(w_i^{\sigma 2}) + \lambda\sigma_1^2(w_1^{SoS}) \tag{7a}$$

$$T_2 = \frac{1}{N}\sum_{i=2}^{N+1}\sigma_i^2(w_i^{\sigma 2}) + \lambda\sigma_2^2(w_2^{SoS}) \tag{7b}$$

-continued $$T_N = \frac{1}{N} \sum_{i=N}^{2N-1} \sigma_i^2(w_i^{\sigma^2}) + \lambda \sigma_N^2(w_N^{SoS}) \quad (7c)$$

The threshold and the second standard deviation may be compared, and it may be detected that an intrusion in the area has occurred if the second standard deviation exceeds the threshold:

$$\bigcirc l=1, \ldots, N_{max} \text{ if } SoS_l > T_l \quad (8)$$

then alarm=true.

In case an intrusion in the area is detected, a notification signal may be sent through a telecommunication link (e.g. telecommunication link 9) to a monitoring website unit (e.g. monitoring website unit 8). The notification may be forwarded through another telecommunication link (e.g. telecommunication link 11) to a user equipment (e.g. end-user smart-phone device 12), and a user (e.g. end user 14) of the user equipment may be notified of the intrusion.

The signal strength samples may be filtered to reduce noise before the processing.

Figure 3:
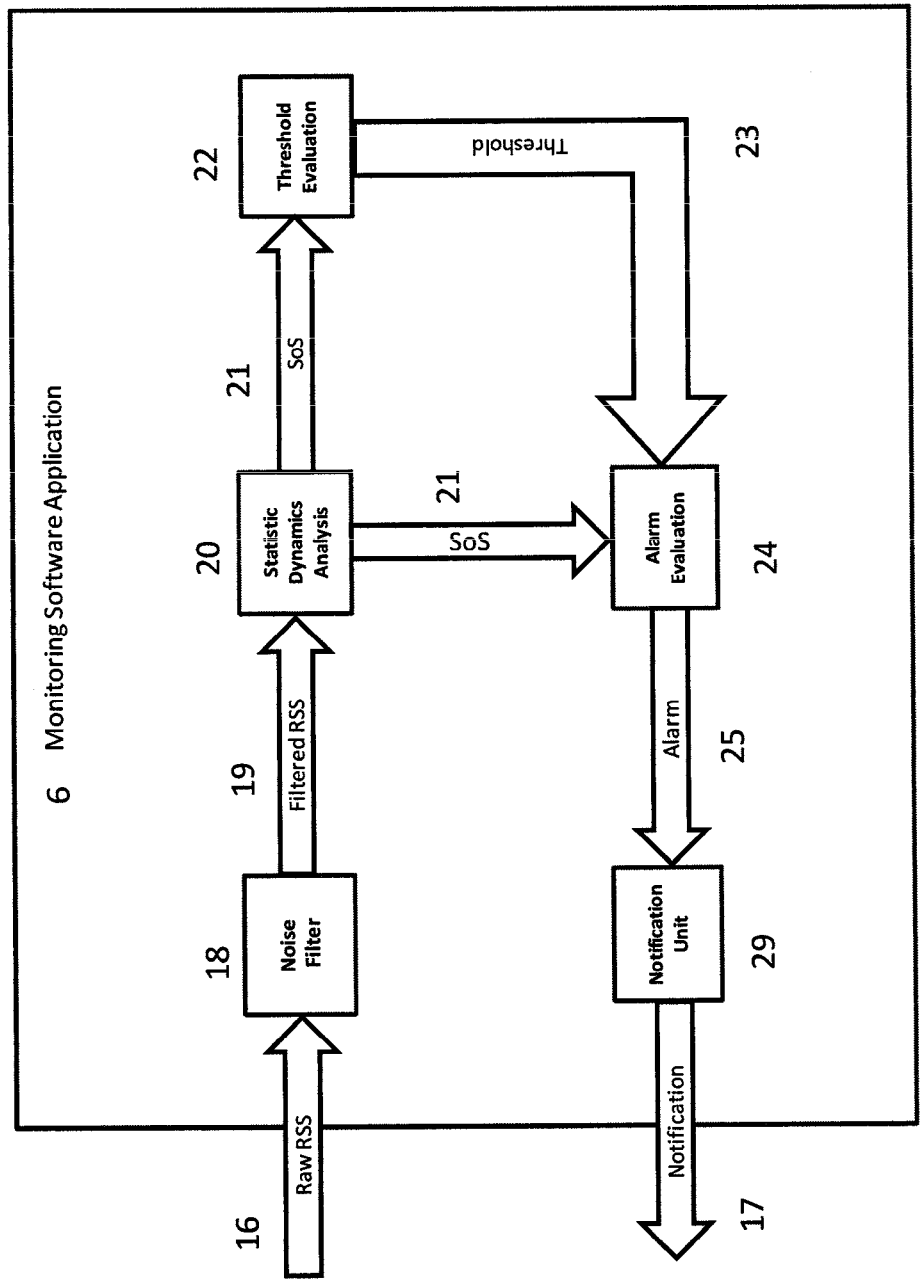
FIG. 3 shows a schematic block diagram illustrating a monitoring process to be implemented as a monitoring software application on a device which is part of a WiFi network serving the indoor environment to be monitored.

Now an embodiment of the monitoring software application unit 6 is described by referring to FIG. 3.

The monitoring software application unit 6 receives raw RSS data 16 as input and outputs a notification signal 17. The raw RSS data 16 is a collection of individual RSS samples that are stored in a moving window as described in above equations (1a)-(1c), where the entries in the array are the individual RSS values and N indicates the length of the window.

A noise filtering unit 18 reduces sources of noise which affect the input raw RSS data 16, and outputs filtered RSS data 19. The filtered RSS data 19 then serves as an input for a statistic dynamics analysis unit 20 that performs an analysis of the filtered RSS data statistical dynamics, and outputs the standard deviation of the standard deviation of the filtered RSS data, i.e. SoS data 21, calculated according to the above equations (2a)-(4c).

A threshold evaluation is performed in a threshold evaluation unit 22. This unit 22 receives as input the SoS data 21 and outputs an alarm decision threshold 23 according to the above equations (6a)-(7c).

An alarm evaluation unit 24 has the purpose of generating at its output an alarm signal 25, from inputs of the SoS data 21 and the alarm decision threshold 23. The alarm signal 25 is generated according to equation (8). If the SoS data 21 exceeds an arithmetic mean of the SoS data 21 plus λ, times the standard deviation of the SoS data 21, the alarm signal 17 is triggered. λ is chosen as the result of a tradeoff between response time and alarm evaluation sensitivity.

A notification unit 29 is responsible to create an interface between a signal processing part of the monitoring software application unit 6 and the monitoring website unit 8. The notification unit 29 receives at its input alarm signals 25 and outputs a notification signal 17 that might trigger different events depending on the user defined settings 15.

Referring to FIG. 1, the notification signal 17 is sent from the smart-phone device 3 to the monitoring website unit 8, where the website monitoring software application unit 10 may use notifications means such as a short message service (SMS) notification, an email notification, a phone call, a social network status update, etc. to notify the end user 14 through the end-user software application unit 13 running on the end-user smart-phone device 12. A short message service (SMS) notification, an e-mail notification, a phone call notification, a social network status update may be also sent to other devices such as a desktop PC, a laptop PC, a tablet PC, a mobile phone, a PDA, in the form of a proper SMS, email, phone call, status update message to notify a user or different users about an event such as the presence of a human body in the monitored environment.

It is to be noted that there may be several transmitting devices (e.g. access point devices 4) and/or several receiving devices (e.g. smart-phone devices 3) between which wireless links are created which are processed by the monitoring software application unit 6. By coordinating measurements of plural devices, a wider area may be monitored to track presence and movement through a space such as a corridor of a building.

Now reference is made to FIG. 4 for illustrating a simplified block diagram of an electronic device suitable for use in practicing the exemplary embodiments of this invention.

A control unit 100, which may be part of or used by the smart-phone device 3 and/or the monitoring software application unit 6, comprises processing resources 101, memory resources 102 and interfaces 103 which are connected via a link 104. The memory resources 102 may store a program.

In general, the exemplary embodiments of this invention may be implemented by computer software stored in the memory resources 102 and executable by the processing resources 101, or by hardware, or by a combination of software and/or firmware and hardware.

The memory resources 102 may be of any type suitable to the local technical environment and may be implemented using any suitable data storage technology, such as semiconductor-based memory devices, magnetic memory devices and systems, optical memory devices and systems, fixed memory and removable memory. The processing resources 101 may be of any type suitable to the local technical environment, and may include one or more of microprocessors, digital signal processors (DSPs) and processors based on a multi-core processor architecture, as non-limiting examples.

According to an aspect of the invention, an apparatus for monitoring an area, which may comprise or use the control unit 100, comprises obtaining means for obtaining signal strength samples by sampling a data signal transmitted from at least one first device and received by at least one second device through at least one wireless link within the area between the at least one first device and the at least one second device, and measuring a signal strength of the sampled data signal, processing means for processing the signal strength samples by forming consecutive first groups of N consecutive signal strength samples such that two directly consecutive first groups are different by one signal strength sample, calculating first standard deviations for each of the consecutive first groups, forming consecutive second groups of N consecutive first standard deviations such that two directly consecutive second groups are different by one first standard deviation, and calculating second standard deviations for each of the consecutive second groups, and detecting means for detecting, based on the second standard deviations, if a fluctuation in the data signal received by the second device has occurred that represents an intrusion in the area.

The apparatus may further comprise creating means for creating the at least one wireless link within the area between the at least one first device and the at least one second device.

The detecting means may form consecutive third groups of N consecutive second standard deviations such that two directly consecutive third groups are different by one second standard deviation, calculate third standard deviations for each of the consecutive third groups, for each third standard deviation, calculate a threshold based on the third standard deviation and N consecutive second standard deviations corresponding to the third standard deviation, compare the threshold and the second standard deviation, and detect that an intrusion in the area has occurred if the second standard deviation exceeds the threshold.

The apparatus may comprise filtering means for filtering the signal strength samples to reduce noise before the processing by the processing means.

The apparatus may comprise sending means for, in case an intrusion in the area is detected, sending a notification signal through a telecommunication link to a monitoring website unit.

The apparatus may be part of the at least one second device.

The obtaining means, processing means, detecting means, creating means, filtering means and sending means may be implemented by the processing resources 101, memory resources 102 and interfaces 103.

Referring to FIG. 3, the processing means may comprise the statistic dynamics analysis unit 20, and the detecting means may comprise the alarm evaluation unit 24 and may further comprise the threshold evaluation unit 22. The filtering means may comprise the noise filter unit 18, and the sending means may comprise the notification unit 29.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. A method of monitoring an area, the method comprising:
   obtaining signal strength samples by:
     sampling a data signal transmitted from at least one first device and received by at least one second device through at least one wireless link within the area between the at least one first device and the at least one second device, and
     measuring a signal strength of the sampled data signal;
   processing the signal strength samples by:
     forming consecutive first groups of N consecutive signal strength samples such that two directly consecutive first groups are different by one signal strength sample,
     calculating first standard deviations for each of the consecutive first groups, forming consecutive second groups of N consecutive first standard deviations such
     that two directly consecutive second groups are different by one first standard deviation, and
     calculating second standard deviations for each of the consecutive second groups; and
   detecting, based on the second standard deviations, if a fluctuation in the data signal received by the second device has occurred that represents an intrusion in the area.

2. The method of claim 1, comprising:
   creating the at least one wireless link within the area between the at least one first device and the at least one second device.

3. The method of claim 1, wherein the detecting further comprises:
   forming consecutive third groups of N consecutive second standard deviations such that two directly consecutive third groups are different by one second standard deviation;
   calculating third standard deviations for each of the consecutive third groups;
   for each third standard deviation, calculating a threshold based on the third standard deviation and N consecutive second standard deviations corresponding to the third standard deviation;
   comparing the threshold and the second standard deviation; and
   detecting that an intrusion in the area has occurred if the second standard deviation exceeds the threshold.

4. The method of claim 1, comprising:
   filtering the signal strength samples to reduce noise before the processing.

5. The method of claim 1, comprising:
   in case an intrusion in the area is detected, sending a notification signal through a telecommunication link to a monitoring website unit.

6. The method of claim 5, comprising:
   forwarding the notification through another telecommunication link to a user equipment; and
   notifying a user of the user equipment of the intrusion.

7. The method of claim 1, wherein at least one of the following applies:
   the area is an indoor environment;
   the at least one second device is a smartphone;
   the at least one first device is an access point;
   the at least one first device and the at least one second device are WiFi-enabled; and
   the intrusion is a presence and/or movement of a human being in the area.

8. A computer program product including a program for a processing device, comprising software code portions for performing the steps of claim 1 when the program is run on the processing device.

9. The computer program product according to claim 8, wherein the computer program product comprises a computer-readable medium on which the software code portions are stored.

10. The computer program product according to claim 8, wherein the program is directly loadable into an internal memory of the processing device.

11. An apparatus for monitoring an area, the apparatus comprising:
    obtaining means for obtaining signal strength samples by:
      sampling a data signal transmitted from at least one first device and received by at least one second device through at least one wireless link within the area between the at least one first device and the at least one second device, and
      measuring a signal strength of the sampled data signal;
    processing means for processing the signal strength samples by:
      forming consecutive first groups of N consecutive signal strength samples such that two directly consecutive first groups are different by one signal strength sample,
      calculating first standard deviations for each of the consecutive first groups, forming consecutive second groups of N consecutive first standard deviations such that two directly consecutive second groups are different by one first standard deviation, and calculating second standard deviations for each of the consecutive second groups; and detecting means for detecting, based on the second standard deviations, if a fluctuation in the data signal received by the second device has occurred that represents an intrusion in the area.

12. The apparatus of claim 11, comprising:

creating means for creating the at least one wireless link within the area between the at least one first device and the at least one second device.

13. The apparatus of claim 11, wherein the detecting means is further configured to form consecutive third groups of N consecutive second standard deviations such that two directly consecutive third groups are different by one second standard deviation;

calculate third standard deviations for each of the consecutive third groups;

for each third standard deviation, calculate a threshold based on the third standard deviation and N consecutive second standard deviations corresponding to the third standard deviation;

compare the threshold and the second standard deviation; and detect that an intrusion in the area has occurred if the second standard deviation exceeds the threshold.

14. The apparatus of claim 11, comprising:

filtering means for filtering the signal strength samples to reduce noise before the processing by the processing means.

15. The apparatus of claim 11, comprising:

sending means for, in case an intrusion in the area is detected, sending a notification signal through a telecommunication link to a monitoring website unit.

16. The apparatus of claim 11, wherein the apparatus is part of the at least one second device.

17. A non-transitory computer-readable medium comprising executable instructions operable to cause an apparatus to:

obtain signal strength samples by:

sampling a data signal transmitted from at least one first device and received by at least one second device through at least one wireless link within the area between the at least one first device and the at least one second device, and measuring a signal strength of the sampled data signal;

process the signal strength samples by:

forming consecutive first groups of N consecutive signal strength samples such that two directly consecutive first groups are different by one signal strength sample, calculating first standard deviations for each of the consecutive first groups, forming consecutive second groups of N consecutive first standard deviations such that two directly consecutive second groups are different by one first standard deviation, and calculating second standard deviations for each of the consecutive second groups; and detect, based on the second standard deviations, if a fluctuation in the data signal received by the second device has occurred that represents an intrusion in the area.

* * * * *